United States Patent [19]
Chiba et al.

[11] 3,844,693
[45] Oct. 29, 1974

[54] OIL SEAL DEVICE FOR ROTARY PISTON ENGINE

[75] Inventors: Ko Chiba; Masayuki Maruyama; Daisaku Kobayashi; Yoshikuni Mizuma, all of Kashiwazaki, Japan

[73] Assignee: Riken Piston Ring Kogyo Kabushiki Kaisha, Tokyo, Japan

[22] Filed: Oct. 3, 1973

[21] Appl. No.: 403,181

[52] U.S. Cl. ............................................. 418/142
[51] Int. Cl. .......................................... F01c 19/08
[58] Field of Search ............ 418/142, 144; 277/81 P

[56] References Cited
UNITED STATES PATENTS

| | | | |
|---|---|---|---|
| 3,396,708 | 8/1968 | Tado | 418/142 |
| 3,456,624 | 7/1969 | Okamoto | 418/142 |
| 3,506,275 | 4/1970 | Moriyama | 418/142 |
| 3,535,061 | 10/1970 | Yamamoto | 418/142 |
| 3,787,152 | 1/1974 | Mitsuyama et al. | 418/142 |

*Primary Examiner*—Carlton R. Croyle
*Assistant Examiner*—O. T. Sessions
*Attorney, Agent, or Firm*—Oldham & Oldham Co.

[57] ABSTRACT

An oil seal device for the side sealing of a rotor, including a combination of an annular wave spring, an O-ring and a metallic sealing ring of a peculiar cross-sectional form, to be fitted in the outer one of two concentric annular grooves formed in each side surface of the rotor. The sealing ring, generally U-shaped in cross section, includes, among others, a relatively thin-walled readily flexible web portion and a radially outwardly projecting annular ridge formed thereon in a position to lie in the open mouth of the annular groove. Owing to the particular formation of the sealing ring, leakage of combustion gases into the annular groove and sludge formation therein are effectively minimized and the danger of the sealing ring sticking in the groove or to the adjacent housing wall surface is eliminated.

1 Claim, 3 Drawing Figures

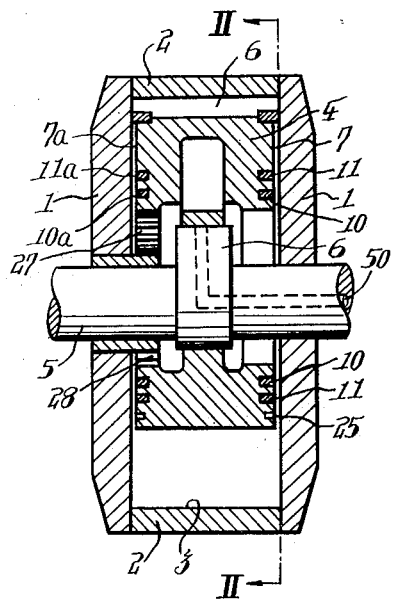
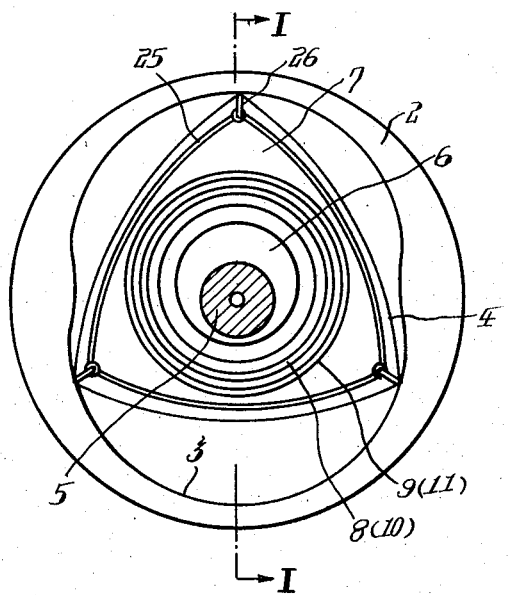
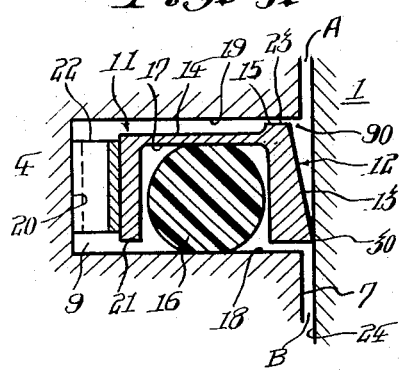

OIL SEAL DEVICE FOR ROTARY PISTON ENGINE

BACKGROUND OF THE INVENTION

This invention relates to oil seal devices for rotary combustion engines and more particularly to those used on the opposite sides of the rotor for sealing against the side housing walls.

As is well known, oil seal devices of the kind described are fitted in annular grooves concentrically formed in the opposite side surfaces of the rotor, two in number on each side thereof, and, in such arrangement, those fitted in the radially outer grooves are naturally highly susceptible to the various injurious effects of combustion gases. With such oil seal devices, therefore, it is required that the sealing ring, intended to serve the gas sealing and oil scraping purposes during engine operation, have a sealing edge conformable to the adjacent housing wall surface at all times to make effective sealing contact therewith as otherwise not only so-called "blow-by" of combustion gases may occur but also sludge formed therefrom may enter the clearances in the ring groove and deposit therein to cause the sealing ring to stick in the groove and lose its oil-scraping function, as has often been the case with conventional oil seal devices of the king described.

SUMMARY OF THE INVENTION

The present invention is designed to overcome the various difficulties previously encountered with conventional oil seal devices of the kind described and more particularly with those used in the radially outer one of the two concentric annular grooves formed in each side surface of the rotor.

The primary object of the present invention is to minimize leakage of combustion gases into the outer annular groove through the interspace between the rotor side and the adjacent housing wall thereby to prevent sludge formation in the annular groove such as may cause the sealing ring to stick therein.

Another object of the present invention is to protect the O-ring of elastic material such as rubber, which is normally fitred together with the metallic sealing ring in the annular groove for sealing engagement with the radially inner side wall thereof, from high heat of combustion gases thereby to prevent the O-ring material from deteriorating at any substantial rate.

A further object of the present invention is to prevent the sealing ring from sticking to the adjacent side housing wall.

Yet another object of the invention is to minimize the injurious effects of sludge formation unavoidable in the annular groove due to more or less leakage of combustion gases therein.

These and other objects of the present invention can be attained by providing a new and improved oil seal device of the kind described which comprises, among others, a metallic sealing ring of generally U-shaped cross section opening radially inside and formed with a radially outwardly projecting annular ridge in a position to lie in the open mouth of the annular groove, through which the sealing ring is fitted therein, said sealing ring having a relatively thin-walled and readily flexible web portion as a whole to exhibit a substantial resiliency in the axial or widthwise direction, which is parallel to the rotor axis. The peripheral ridge formation on the sealing ring is intended to make the radial clearance between the sealing ring itself and the radially outer side wall of the annular groove as small as possible particularly in the mouth of the annular groove thereby to minimize the leakage into the annular groove of combustion gases passing through the interspace between the rotor side surface and the adjacent housing wall. The thin-wall web formation of the sealing ring is intended not only to give an appropriate axial resiliency to the ring thereby to prevent it from sticking to the adjacent side housing wall but also to form a relatively large radial clearance between the ring web portion and the adjacent wall of the annual groove thereby to minimize the injurious effects of any aludge formation therein.

The present invention will next be described in further detail with reference to the accompanying drawing.

BRIEF DESCRIPTION OF THE DRAWING

In the drawing,

FIG. 1 is a side elevational view, in axial cross-section, of a rotary combustion engine incorporating one preferred embodiment of the invention, and taken substantially along the line I — I in FIG. 2;

FIG. 2 is a transverse crosssectional view of same, taken substantially along the line II — II in FIG. 1; and FIG. 3 is a fragmentary cross-sectional view showing one of the oil seal devices illustrated in FIG. 1, on an enlarged scale.

DESCRIPTION OF THE PREFERRED EMBODIMENT

Referring to the drawing and first to FIG. 1, reference numeral 1 designates the opposite side housings of the illustrated rotary combustion engine, and 2 designates its central housing having a trochoidal inner peripheral wall and forming together with the opposite side housings 1, 1 an engine housing which accommodates an approximately triangular rotor 4, which has three arcuate sides, as shown in FIG. 2. The rotor 4 is rotatably mounted on an eccentric 6 formed integral with a rotative shaft 5 journaled in the opposite side housings 1, 1 and is rotatable with its apex portions held in sliding contact with the inner wall surface 3 of the central housing 2. The rotor 4 is formed in each of its side surfaces 7, 7a (FIG. 1) with two inner and outer annular grooves 8, 9 or 8a, 9a concentric with each other and with the eccentric 6, as seen in FIG. 2. Two oil seal devices 10, 11 or 10a, 11a are fitted respectively in the inner and outer annular grooves 8, 9 or 8a, 9a. The outer oil seal devices 11 and 11a are formed according to the principles of the present invention and identical with each other.

Description will now be made of one of the outer oil seal devices, 11, with reference to FIG. 3, in which the device 11 is shown fitted in the associated outer annular groove 9 and held in compression by the adjacent side housing wall 1. The upper or radially outer interspace A between the rotor 4 and the side housing wall 1 communicates with the combustion and expansion chambers formed in the engine housing while the lower or radially inner interspace B between the rotor 4 and side housing wall 1 is in communication with the central region of the engine, in which oil under pressure is fed to serve the lubrication and cooling purposes. Reference numeral 12 designates a sealing ring forming an essential part of the oil seal device 11 and made of wear-resistant metal. The sealing ring 12 is generally U-shaped in cross section and radially inwardly open with the web portion 14 extending along the radially outer side wall 19 of the groove 9. One of the side flange portions of the sealing ring 11 which is adjacent to the side housing wall 1 has an outer surface 13 tapered to form a sealing edge 30 for sealing engagement with the adjacent side housing wall surface 24. The web portion 14 of sealing ring 12 is formed along one of its side edges lying in the mouth 90 of annular groove 9 with a radially outwardly projecting ridge 23 and, as shown, is made generally thin-walled and flexible to make the sealing ring 12 as a whole substantially resilient in the direction of its axis, which is parallel to the rotor axis. Owing to the axial resiliency, the sealing ring 12 can make effective sealing engagement with the adjacent side housing wall surface 24 without any danger of sticking thereto, as will be described later in further detail.

Reference numeral 16 designates an O-ring formed of elastic material such as rubber and fitted in the annular groove 9 in combination with the sealing ring 12. Being accommodated in the U cavity of the sealing ring 12, the O-ring 16 is held in close contact with the inner peripheral surface 17 of the web portion 14 of sealing ring 12, on one hand, and with the radially inner side wall 18 of the annular groove 9, on the other hand, and, in this manner, serves to prevent oil leakage around the sealing ring 12 in an effective manner.

The ridge formation 15 on the web 14 of sealing ring 12 is made so as to define a minimum of radial clearance 23 between the outer peripheral wall 19 of the annular groove 9 and the radial ridge 15 itself which allows free axial or lateral movement of the sealing ring 12 in the groove 9. This is intended to minimize leakage of combustion gases into the annular groove 9, which may cause sticking of the sealing ring 12 in the groove and deterioration of the rubber O-ring 16 under high heat of combustion gases, and also to minimize radial displacement of the sealing ring 12 in the groove 9 thereby to prevent the O-ring 16 from being excessively strained. The sealing ring 12 combined with the O-ring 16 in the manner described above is biased axially rightward under the effect of an annular wave spring 22 interposed between the bottom wall 20 of annular groove 9 and the adjacent flange portion 21 of sealing ring 12 itself so that the sealing edge 30 of the tapered ring flange portion 13 is pressed against the inside wall surface 24 of adjacent side housing 1 to form an effective annular seal therewith. Incidentally, in FIGS. 1 and 2, reference numeral 25 designates gas seals fitted in the opposite side surfaces 7 and 7a of the rotor 4 along the respective arcuate edges of the rotor surfaces; and 26 designates apex seals. Further, in FIG. 1, reference numeral 27 designates an internal gear formed integral with the rotor 4 and held in mesh with a pinion 28 fixedly mounted on the rotative shaft 5 on one side of eccentric 6.

Description will next be made of the operation of the oil seal device described above.

During engine operation, lubricating oil is fed into the central region of the engine, for example, through an axial oil passageway 50 (FIG. 1) formed in the engine shaft 5 and rises into the interspaces B between the opposite sides of the rotor 4 and the adjacent housing wall surfaces 24 (See FIG. 3). As will readily be appreciated, however, any lubricating oil tending to rise further along the side housing wall surfaces 24 is effectively scraped lack by the edge 30 of the respective sealing ring 12 and any oil tending to proceed around the sealing ring 12 is effectively held back under the sealing effect of O-ring 16.

On the other hand, combustion gases flowing into the interspace A would form sludge in the annular groove 9, if allowed to enter therein, and such sludge would cause the sealing ring to stick therein. According to the present invention, however, the combustion gases flowing into the interspace A are for the most part kept out of the annular groove 9 by the radial ridge formation 15 on the sealing ring 12, which defines a very limited clearance 23, and thus sludge formation, if any, in the annular groove 9 is reduced to a minimum. In addition, the web portion 14 of the sealing ring 12 is hardly susceptible to the injurious effect of any sludge formation thereabout as it is made thin-walled and substantially spaced from the adjacent wall surface 19 of the annular groove 9, as shown in FIG. 3. Moreover, any sludge formed in the region of clearance 23 and depositing on the radial ridge 15 of sealing ring 12 or the adjacent groove wall 19 is crushed down therebetween under the oscillatory movement of the rotor 4 relative to the side housings 1, 1 in engine operation. It will thus be readily appreciated that the oil seal device of the present invention is kept completely free from the danger of sticking in the groove in which it is fitted.

Further, the thin-wall formation of web 14 of the sealing ring 12 imparts a substantial flexibility to the web and accordingly a substantial axial resiliency to the whole of sealing ring 12. This ensures that during engine operation the sealing ring 12 is held at all times in effective sealing engagement with the adjacent housing wall surface 24 under the bias of the wave spring 22. In addition, radial oscillation of the sealing ring 12 in the annular groove 9, occurring with the oscillatory rotation of rotor 4, is in fact limited to an extent as small as approximately 0.1 millimeter owing to the formation of radial ridge 15 on the outer periphery of the sealing ring 12 and this minimizes the rate of deterioration of the elastic O-ring 16 as caused by substantial mechanical stress and strain to which it is conventionally subjected.

In view of the above, it is believed that a novel and improved oil seal device has been provided by the present invention for the side sealing of rotary combustion engines and that the objects of the invention have been achieved.

While one preferred embodiment of the invention has been shown and described, it will be apparent to those skilled in the art that various changes and modifications may be made therein without departing from the scope of the invention as defined in the appended claim.

What is claimed is:

1. In a rotary combustion engine in which the rotor is formed in each of the opposite side surfaces thereof with two concentric annular grooves to fittingly receive respective oil seal devices, an oil seal device fitted in the outer annular groove and comprising: annular wave spring means (22) arranged in the bottom of said outer annular groove (9), a metallic sealing ring (12) of generally U-shaped cross section opening radially inside and fitted in said outer annular groove in pressure engagement with the adjacent housing wall surface under the bias of said annular wave spring means, an O-ring of elastic material (16) received in the U cavity of said sealing ring, said sealing ring having a generally thin-walled web portion (14) thereby to exhibit as a whole a substantial axial resiliency, and an annular, radially outwardly projecting ridge (15) formed on the web portion of said sealing ring at a location in the open mouth (90) of said annular groove (9).

* * * * *

UNITED STATES PATENT OFFICE
CERTIFICATE OF CORRECTION

Patent No. 3,844,693           Dated October 29, 1974

Inventor(s) Ko Chiba et al

It is certified that error appears in the above-identified patent and that said Letters Patent are hereby corrected as shown below:

Column 1, line 43, "fitred" should be -- fitted --

Column 2, line 13, "aludge" should be -- sludge --

Signed and sealed this 4th day of February 1975.

(SEAL)
Attest:

McCOY M. GIBSON JR.
Attesting Officer

C. MARSHALL DANN
Commissioner of Patents